United States Patent Office 3,232,162
Patented Feb. 1, 1966

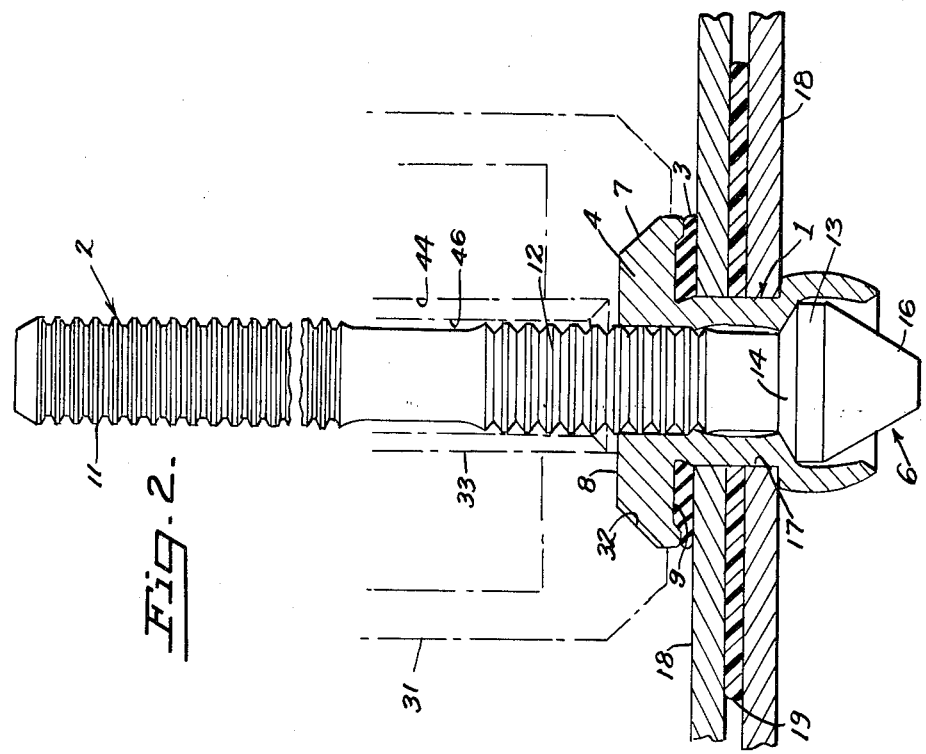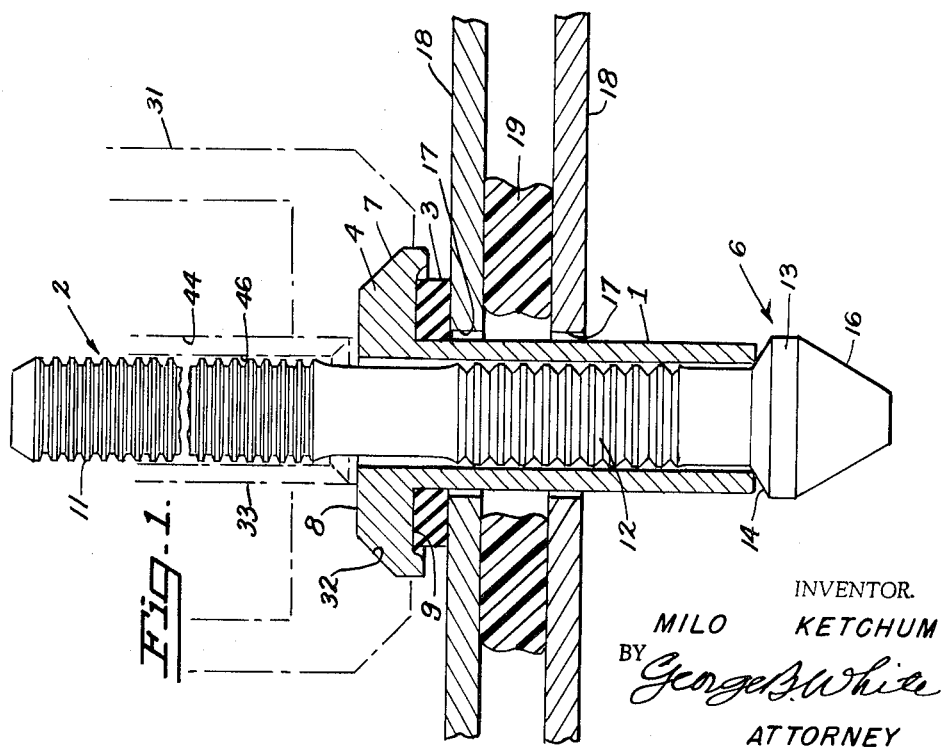
INVENTOR.
MILO KETCHUM
BY George B. White
ATTORNEY

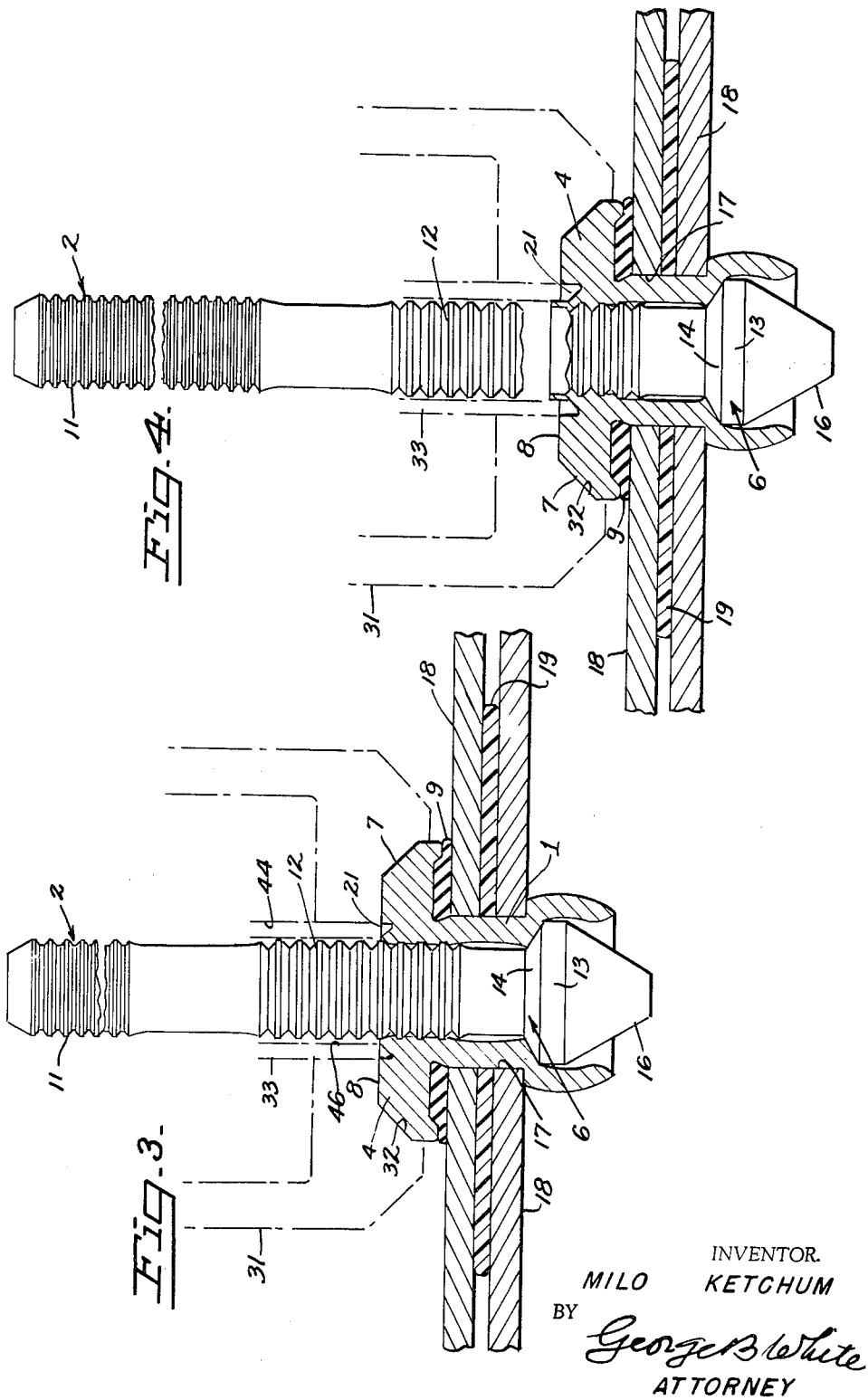

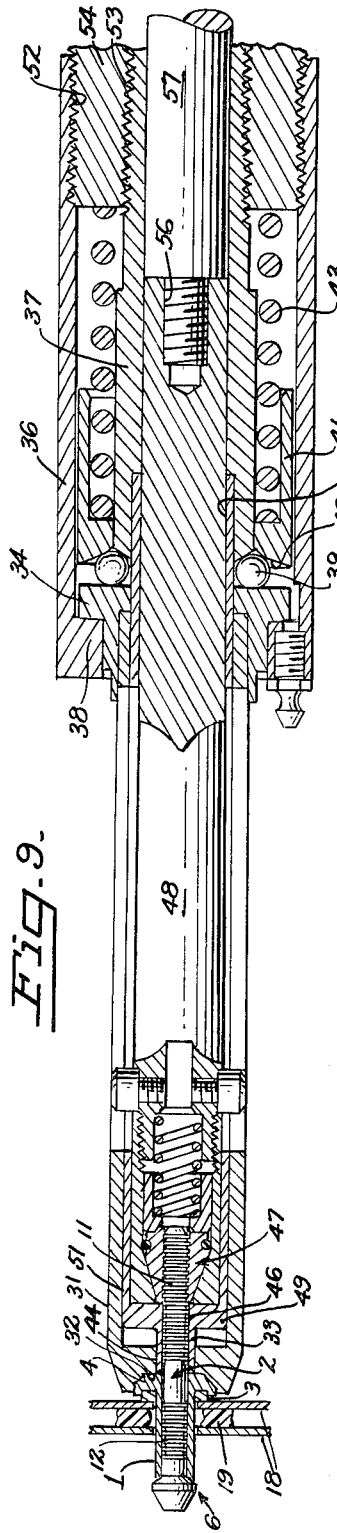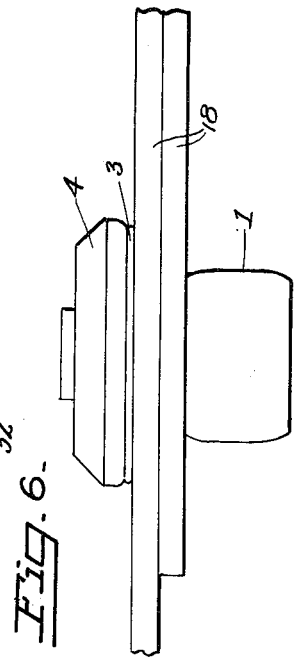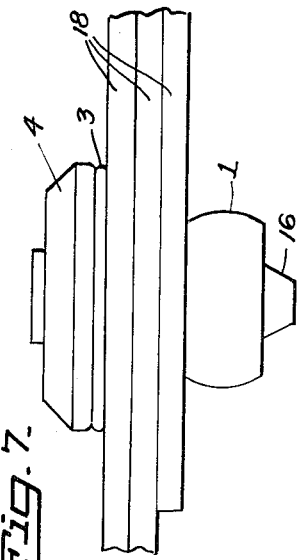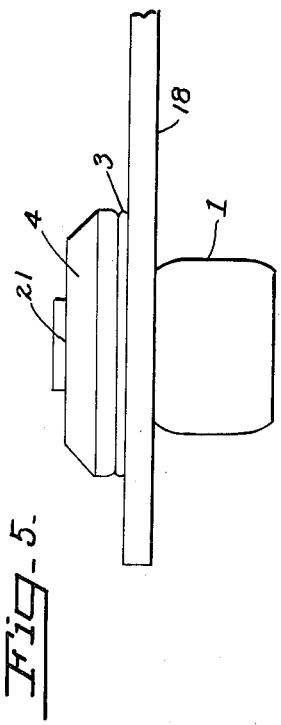

3,232,162
BLIND LOCKED SPINDLE RIVET AND METHOD
FOR APPLYING THE SAME
Milo Ketchum, Santa Ana, Calif., assignor to Textron
Industries, Inc., a corporation of Delaware
Filed Sept. 17, 1963, Ser. No. 309,448
7 Claims. (Cl. 85—77)

This invention relates to a blind locked spindle rivet and method for applying the same.

This blind rivet and method is particularly suitable for use in the sheet metal building industry wherein there is need for a blind fastener capable of being installed in a variety of grip thicknesses as formed by a variety of layers of thin sheets of sheet metal. In this industry in the same structure frequently there are utilized two or more superimposed thin sheets of sheet metal, and the hole size through these sheets is generally larger than the fastener or rivet because the holes are frequently pre-punched in the sheets and it is desirable to provide some allowance for misalignment of the holes through the superimposed sheets.

A rivet utilized in said industry in connection with sheet metal must also have clamping ability so that during its installation the rivet will draw the sheets together and eliminate or minimize the space between the sheets. Frequently in such installations some water-repellent sealing material is used which usually is of a plastic nature. Usually this plastic water-repellent material is put on in a cylindrically extruded form and it is flattened out by the pressing of the sheets together as the fastener is applied.

An object of the invention is to provide a rivet which can be used with efficiency for a variety of grip thicknesses within a range between a given minimum and a given maximum grip thickness; and in which the stem can be locked to the rivet head and broken at about the level of the top of the rivet head.

Another object of the invention is to provide a method of fastening a pulling stem into a fastener head for securing a selected grip thickness of work together by providing the stem with a series of break-neck grooves, pulling the stem through said work and through said head for clinching the work so that a plurality of said break-neck grooves are within said head, indenting the top of the fastener around said stem and simultaneously restraining radial outward expansion of the head thereby to force flow of the head material radially inwardly into the adjacent break-neck grooves to interlock said stem and said head and to weaken the outermost break-neck groove at the top of said head.

Another object of the invention is to provide a method of riveting wherein a tubular blind rivet is extended through holes in a work together with a stem projecting through the head of the blind rivet and engaging the tail of the blind rivet, having the steps of pressing on the head of the rivet while pulling the stem so as to form a blind head on the tail of the rivet for clinching the work and fastening the rivet, providing a series of breakneck grooves on the stem so located that several of said grooves are within said rivet head after said blind head had been completely formed, then shifting the pressure to the central portion of the rivet head around said stem so as to depress the material on the top of the head around said stem and restraining outward expansion of said rivet head, thereby to force displaced material inwardly into the break-neck grooves within said head to interlock said rivet head and stem and to weaken the stem at the outermost groove thereof at about the top of said rivet head, then further pulling said stem until it breaks at said weakened break-neck groove, and thus providing for efficient operation of a blind rivet in works in a given range of thicknesses with locked stem and always broken at about the top of the rivet head.

I am aware that some changes may be made in the general arrangements and combinations of the several devices and parts, as well as in the details of the construction thereof without departing from the scope of the present invention as set forth in the following specification, and as defined in the following claims, hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a cross-sectional view showing the rivet inserted through the holes of two superimposed sheets.

FIG. 2 is a cross-sectional view of the rivet in the sheets after the stem is pulled to form the blind head on the tail of the rivet to squeeze the sheets together.

FIG. 3 is a cross-sectional view of the applied rivet showing the partially depressed groove in the top of the rivet head around the stem.

FIG. 4 is a sectional view showing the groove in the top of the rivet head further depressed for flowing material into the break-neck grooves adjacent the stem and showing the stem broken at the top of the rivet head.

FIGS. 5, 6, 7 and 8 show the appearance of the applied blind rivet respectively in one, two, three and four sheet thicknesses.

FIG. 9 is a diagrammatic view of a pulling head device for engaging the head of the rivet while pulling the stem and then shifting the pressure to a central anvil or forming dye for depressing a groove in the top face of the rivet head about the stem.

As shown in FIG. 1 the rivet assembly is composed of a hollow tubular rivet 1, a stem 2 and a neoprene sealing washer 3 under the head 4 of the tubular rivet 1. The stem 2 has a tail former 6 adapted to spread the blind end or tail of the tubular rivet 1.

The rivet head 4 has a generally frusto-conical periphery 7 and a substantially flat top face 8. The underface of the rivet head 4 has a recess 9 therein in which is seated the sealing washer 3.

The stem 2 has a portion adapted to be engaged by a pulling element, for instance a serrated portion 11. The stem 2 also has a series of break-neck grooves 12 on its portion between the serrated portion 11 and the tail former 6. The series of grooves 12 extend over a sufficient length of the stem to be within the head 4 at all various grip thicknesses within the overall range of thicknesses given for the rivet. The series of break-neck grooves begins at a point spaced from the tail former 6 and ends at a point spaced from the serrated portion 11.

The tail former 6 of the stem 2 has a generally cylindrical portion 13 of somewhat larger diameter than the outside diameter of the tubular rivet 1, and a frusto-conical entering shoulder 14 between the stem 2 and the cylindrical portion 13. The tail former terminates in a tapered frusto-conical end 16 extended from the cylindrical portion 13.

In the method of riveting, the tubular rivet 1 and the stem 2 are inserted through substantially registering holes 17 of superimposed sheets 18. A layer of sealant material 19 is interposed between the sheets 18 around the location of the holes 17. Simultaneously pressure is applied to the rivet head 4 and pull to the stem 2 so that the stem 2 is pulled through the tubular rivet 1, for forming the blind head on the rivet. As the shoulder 14 of the former head enters the tail of the tubular rivet 1 and expands it, it pushes material of the rivet radially outwardly as well as axially inwardly until the shoulder 14 is in substantial registry with the inner face of the work and then continuing the forming of the blind head on the tail of the tubular rivet until the sheets 18 are clamped tightly as shown in FIG. 2. Simultaneously the sealant 19 is expanded and flattened, and the sealing washer 3 is also expanded and flattened to a desired grip. Simultaneously axial force and displacement of material expands the tubular rivet within the holes 17 against the sides of the holes 17, as shown in FIG. 2. Then while holding the stem 2 under tension and restraining the outer periphery of the rivet head against outward peripheral expansion a groove 21 is depressed into the top flat face 8 of the rivet head 4 so as to flow material from the rivet head 4 radially inwardly into the break-neck grooves 12 of the stem 2 as shown in FIGS. 3 and 4. Then continuing the pull of the stem 2 and simultaneously applying further pressure in said depressed groove 21 further inward flowing of material is caused and the axial or prying forces on the break-neck groove 12 adjacent the top of the rivet head weaken the said break-neck groove thereby to break the stem 2 at said outermost break-neck groove 12.

As shown in FIGS. 5, 6, 7 and 8 the blind head on the tail of the rivet becomes shorter as the grip length or thickness increases. The break-neck grooves 12 inside of the rivet head 4 are firmly engaged by the material forced into them by the forming of the top depressed groove 21, while the peripheral expansion of the rivet head is restrained, which material functions to lock the stem 2 in the rivet head 4. The compressive force in the break-neck groove 12 nearest to the top face 8 of the rivet head 4 and nearest to a free groove 12, is combined with the stress created at this break-neck groove 12 by the pull on the stem 2 determines the breaking point of the stem in each operation.

In normal practice this method and rivet works very satisfactorily in a considerable range of grip thicknesses, for instance from a minimum total grip thickness of 1/16" to a maximum total grip thickness of 3/8" which is illustrated graphically in FIGS. 5 to 8 inclusive.

In FIG. 9 is shown a diagrammatic view of a pulling head by which the aforedescribed method may be performed and the said blind rivet may be installed. The purpose of this pulling head is to provide the means for exerting the pulling reaction pressure on the rivet head 4 by means of a sleeve 31, which latter has a recess 32 therein fitting over the tapered periphery of the rivet head 4, during the drawing of the sheets 18 together and during the complete formation of the blind head on the tail of the rivet 1, and thereafter for transferring most of the said pulling reaction pressure to a swaging anvil 33 to depress the groove or notch 21 in the top face 8 of the rivet head 4 and thereby lock the stem 2 to the rivet head 4 as heretofore described.

The sleeve 31 is cylindrical and has an integral base 34, which latter is slidable in a housing 36. A fixed backup 37 is held in fixed relation relative to the housing 36 and spaced from the forward end of the housing 36. The integral base 34 bears against a flange 38 on the forward end of the housing 36. A plurality of balls 39 are located between the forward end of the fixed backup 37 and the integral base 34. A locking sleeve 41 is slidable in the space between the fixed backup 37 and the housing 36. The locking sleeve 41 has a suitably curved pressure face 42 in contact with the balls 39 normally to hold the balls 39 against radial outward movement. A coil spring 43 inside of the locking sleeve 41 urges the locking sleeve 41 into the locking position. Thus, as the recess 32 in the sleeve 31 is pressed on the rivet head 4 by the pressure applied through the housing 36, the thrust from the sleeve 31 and from its base 34 is backed against the balls 39 and is counter-acted by the fixed backup 37 and by the spring loaded locking sleeve 41. The tension of the spring load, the angle of the curved end 42 of the locking sleeve 41, and the taper at the adjacent end of the backup 37 are the factors which predetermine the amount of load which can be exerted on the spring 43 before the locking sleeve 41 is caused to depress the spring 43 and so as to release the balls 39 so that said balls 39 can travel outwardly and along the outside of the backup 37 after the predetermined load is reached. The spacing between the backup 37 and the housing 36 is such as to accommodate the balls 39 in the released position.

The anvil 33 is slidable in a central aperture 44 through the end of the sleeve 31. The anvil also has a hole 46 therethrough to accommodate the rivet stem 2. The stem 2 extending through the hole 36 is engaged by a suitable jaw device 47 provided in the end of a drawbolt 48 for pulling the stem 2.

The anvil 44 has an enlarged head 49 on an anvil sleeve 51 which latter extends between the sleeve 31 and the drawbolt 48 so as to extend into a pocket 52 in the backup 37 and bear against the bottom of the pocket 52.

Thus when the aforedescribed tool is pressed on the rivet head 4 and the stem 2 is pulled by the drawbolt 48 the reaction load is carried through the balls 39 against the tapered forward end of the fixed backup 37. After the sheets 18 are drawn together and the blind head is completely formed and the load exceeds the predetermined resistance or reaction, then the load on the balls 39 overcomes the spring tension 43 and will push the locking or reaction sleeve 41 out of the way so that the balls 39 travel outwardly and between the housing 36 and the backup 37 under the pressure exerted by the sleeve base 34. As a result the sleeve base 34 and the sleeve 31 move inwardly of the housing 36 and toward the backup 37, and along the fixed anvil sleeve 51 so as to expose the anvil 33 and thus transfer most of the pressure of the pulling reaction on to the anvil 33, press the sharp edges of the anvil 33 into the top flat face 8 of the rivet head 4 around the stem 2 so as to form the groove 21 and thereby swage the head material radially inwardly of the rivet head 4 and into the adjacent grooves 12 of the stem 2 as heretofore described. In the cycle of operating this tool a relatively high load can be exerted on the nose of the outer sleeve 31 to take the reaction load of pulling the stem 2 of the rivet 1, upsetting the rivet, and clinching the sheets 18 together, after which the locking spring 41 will yield and be pressed back so as to release most of this load from the sleeve 31. The spring 43 will exert a relatively small reaction load on the base 34 and on the sleeve 31 so as to permit most of the reaction load from the pulling of the stem 2 to be exerted through the anvil 33 for depressing the top groove 21 for locking the stem into the rivet head. The load exerted by the spring 43 through the sleeve 31 and through the recess 32 to the conical shaped outer periphery 7 of the rivet head 4 is sufficient to prevent outward spreading or expansion of the rivet head 4 and restrain radial outward flow during the grooving action of the anvil 33 thereon.

This pulling head is usually attached to a suitable power device, for instance the internal threads 52 of the housing 36 and the external threads 53 of the backup 37 are attached to a suitable pressure member 54 of the usual power device so as to hold the backup 37 and the housing 36 in fixed relation to one another. The internal threaded socket 56 in the end of the drawbolt 48 is connected to a piston shaft pulling element 57 of the power device, so that when power is suitably applied the drawbolt 48 is pulled inwardly or away from the nose of the sleeve 31 for pulling the stem 2 through the rivet head 4, and applying the respective reaction loads or pressures as heretofore described.

I claim:
1. A locked stem blind rivet assembly comprising
 (a) a tubular rivet

(b) a head on the tubular rivet having a periphery adapted to be confined against radial expansion
(c) a stem extended through the rivet
(d) a former on the stem drawn into the tail of said tubular rivet and forming a blind head on said tail and clinching the layers of work together
(e) a plurality of break-neck grooves on the portion of said rivet extended through said head
(f) a depressed groove in the top of said rivet head being depressed to a sufficient depth so that displaced material forced into said break-neck grooves inwardly of said recess locks said break-neck grooves into said head.

2. A locked stem blind rivet assembly as defined in claim 1, and
(g) a recess on the underside of said face
(h) and a sealant contained in said recess and flattened and compressed by the setting of the rivet.

3. In a method of setting a fastener by pulling a stem through a head member of the fastener while said member is held against the work, said stem member having a series of break-neck grooves on the portion thereof at least partly within said head member when said fastener is set, the steps of
(a) exerting pressure on said head member toward the work and simultaneously confining the periphery of said head member against radial outward expansion and setting the fastener
(b) forming a depressed groove in the top of said head member spaced around said stem while still confining the periphery of said head against radial expansion
(c) deepening said depressed groove so as to depress the material radially inwardly of the top of the head member between the groove and the stem thereby to flow material inwardly into the break-neck groove adjacent the top of said head member so as to exert pressure on the sides of said break-neck groove for weakening said stem at said groove and for locking said groove to said head.

4. In a method of setting a blind rivet having a tubular rivet with a head thereon and a stem extended through said tubular rivet and beyond said head and said stem having a former adjacent the tail of said tubular rivet adapted to enter the tail of said tubular rivet and expand it into a blind head for clinching the work together, said stem having an end adapted for engagement by a pulling device, and having a series of break-neck grooves located in said head when the rivet is set, the steps of
(a) exerting pressure on said rivet head and simultaneous pull on said rivet stem for forming said blind head and clinching the work (b) confining the outer periphery of said rivet head against radial outward expansion
(c) forming a depressed groove in the top of the rivet head by applying pressure to a limited area of the top of said rivet head spaced around said stem so as axially to depress the material of said head inwardly from the top and to flow depressed material between the depressed groove and said stem radially inwardly into the break-neck groove adjacent the top of said rivet head thereby to weaken said stem at said break-neck groove and lock said head to said stem
(d) further pulling said stem until it breaks at said weakened break-neck groove.

5. In the method of setting a blind rivet as defined in claim 4, and
(e) before the breaking of said stem deepening the depressed groove in the top of said rivet head so as to flow material radially inwardly into several of said break-neck grooves for locking said stem in said tubular rivet.

6. In the method of setting a blind rivet as defined in claim 4, and
(e) during the forming of said blind head on said rivet by said former of the stem, flowing material axially inwardly of the tubular rivet within the work for radially expanding said tubular rivet in said work.

7. In the method of setting a blind rivet as defined in claim 6, and
(f) placing sealing substance between said head and the work and between layers of said work
(g) and simultaneously with the forming of said blind head and the clinching of said work compressing and flattening said sealing substance.

References Cited by the Examiner
UNITED STATES PATENTS

| | | | |
|---|---|---|---|
| 2,250,343 | 7/1941 | Zigler. | |
| 2,298,203 | 10/1942 | Eklund | 85—74 |
| 2,466,811 | 4/1949 | Huck | 85—78 |
| 2,531,048 | 11/1950 | Huck. | |
| 2,635,501 | 4/1953 | Eichner | 85—72 |
| 2,707,322 | 5/1955 | Strain et al. | 218—29 |
| 2,787,932 | 4/1957 | Morton | 85—70 |
| 2,978,946 | 4/1961 | Looker | 85—5 |
| 3,078,002 | 2/1963 | Rodgers | 85—73 |

CARL W. TOMLIN, *Primary Examiner.*

EDWARD C. ALLEN, *Examiner.*